United States Patent
Gleyzes et al.

(10) Patent No.: US 12,033,415 B2
(45) Date of Patent: *Jul. 9, 2024

(54) SYSTEMS AND METHODS FOR GENERATING DOCUMENT NUMERICAL REPRESENTATIONS

(71) Applicant: Xero Limited, Wellington (NZ)

(72) Inventors: Jerome Gleyzes, Wellington (NZ); Mohamed Khodeir, Wellington (NZ); Salim Fakhouri, Wellington (NZ); Yu Wu, Wellington (NZ); Soon-Ee Cheah, Wellington (NZ)

(73) Assignee: XERO Limited (NZ)

( * ) Notice: Subject to any disclaimer, the term of this patent is extended or adjusted under 35 U.S.C. 154(b) by 0 days.

This patent is subject to a terminal disclaimer.

(21) Appl. No.: 18/169,878

(22) Filed: Feb. 16, 2023

(65) Prior Publication Data
US 2023/0206676 A1    Jun. 29, 2023

Related U.S. Application Data

(63) Continuation of application No. 17/869,044, filed on Jul. 20, 2022, now Pat. No. 11,694,463, which is a (Continued)

(30) Foreign Application Priority Data

Feb. 18, 2021 (AU) ................ 2021900419

(51) Int. Cl.
*G06V 30/416* (2022.01)
*G06V 30/14* (2022.01)
(Continued)

(52) U.S. Cl.
CPC ........ *G06V 30/416* (2022.01); *G06V 30/1448* (2022.01); *G06V 30/18* (2022.01); *G06V 30/19147* (2022.01)

(58) Field of Classification Search
CPC ................. G06V 30/416; G06V 30/18; G06V 30/19147; G06V 10/761; G06V 10/806;
(Continued)

(56) References Cited

U.S. PATENT DOCUMENTS 11,694,463 B2 *  7/2023  Gleyzes ................. G06V 30/10
                                                       382/190
2003/0110181 A1  6/2003  Schuetze et al.
(Continued)

FOREIGN PATENT DOCUMENTS

CN     110647632 A    1/2020
WO    2021077168 A1   4/2021

OTHER PUBLICATIONS

International Search Report and Written Opinion as issued in connection with International Patent Application No. PCT/NZ21/50133, dated Dec. 20, 2021, 23 pages.
(Continued)

*Primary Examiner* — Samir A Ahmed

(57) ABSTRACT

Described embodiments relate to a method comprising: determining a candidate document comprising image data and character data and extracting the image data and the character data from the candidate document. The method comprises providing, to an image-based numerical representation generation model, the image data, and generating, by the image-based numerical representation generation model, an image-based numerical representation of the image data. The method comprises providing, to a character-based numerical representation generation model, the character data; and generating, by the character-based numerical representation generation model, a character-based numerical representation of the character data. The method comprises providing, to a consolidated image-character based numerical representation generation model, the image-based numerical representation and the character-based numerical
(Continued)

representation; and generating, by the consolidated image-character based numerical representation generation model, a combined image-character based numerical representation of the candidate document.

17 Claims, 6 Drawing Sheets

Related U.S. Application Data continuation of application No. PCT/NZ2021/050133, filed on Aug. 19, 2021.

(51) Int. Cl.
  *G06V 30/18* (2022.01)
  *G06V 30/19* (2022.01)

(58) Field of Classification Search
  CPC .... G06V 30/10; G06V 30/413; G06V 30/418; G06V 10/82
  See application file for complete search history.

(56) References Cited

U.S. PATENT DOCUMENTS

| | | |
|---|---|---|
| 2011/0258195 A1 | 10/2011 | Welling et al. |
| 2011/0309138 A1 | 12/2011 | Wu et al. |
| 2012/0201457 A1 | 8/2012 | Bart et al. |
| 2013/0170349 A1 | 7/2013 | Wang et al. |
| 2018/0108124 A1 | 4/2018 | Guo et al. |
| 2018/0232204 A1 | 8/2018 | Ghatage et al. |
| 2019/0147304 A1 | 5/2019 | Liu et al. |
| 2020/0177942 A1 | 6/2020 | Wu et al. |
| 2020/0311467 A1 | 10/2020 | Srivastava et al. |
| 2021/0182550 A1 | 6/2021 | Semenov |
| 2021/0406673 A1 | 12/2021 | Pardeshi et al. |

OTHER PUBLICATIONS

U.S. Non Final Office Action in U.S. Appl. No. 17/869,044 dated Feb. 1, 2023, 17 pages.

Chollet, F., "Xception: Deep Learning with Depthwise Separable Convolutions", Proceedings of the IEEE Conference on Computer Vision and Pattern Recognition (CVPR), pp. 1251-1258 (2017).

Kingma, D, P., and Ba, J. L., "Adam: A Method for Stochastic Optimization", available at https://arxiv.org/pdf/1412.6980.pdf, pp. 1-15 (Jan. 30, 2017).

Restriction Requirement in U.S. Appl. No. 17/869,044 dated Nov. 30, 2022, 5 pages.

Notice of Allowance U.S. Appl. No. 17/869,044 dated Feb. 23, 2023, 18 pages.

\* cited by examiner

SYSTEMS AND METHODS FOR GENERATING DOCUMENT NUMERICAL REPRESENTATIONS

TECHNICAL FIELD

Embodiments generally relate to systems, methods and computer-readable media for generating numerical representation of documents. Some embodiments relate in particular to systems, methods and computer-readable media for determining or identifying attributes, such as entity identifiers, associated with documents using such numerical representation of documents.

BACKGROUND

Manually reviewing documents to extract information from them can be a time-intensive, arduous and error-prone process. For example, documents need to be visually inspected to extract specific information from the documents. After the visual inspection, the determined information needs to be manually entered into a computer system. Data entry processes are often prone to human error. If a large number of documents need to be processed, significant time and resources may be expended to ensure that complete and accurate data entry has been performed.

It is desired to address or ameliorate some of the disadvantages associated with prior methods and systems for processing documents and extracting information from documents, or at least to provide a useful alternative thereto.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

SUMMARY

Described embodiments relate to a method comprising: determining a candidate document comprising image data and character data; extracting the image data and the character data from the candidate document; providing, to an image-based numerical representation generation model, the image data; generating, by the image-based numerical representation generation model, an image-based numerical representation of the image data; providing, to a character-based numerical representation generation model, the character data; generating, by the character-based numerical representation generation model, a character-based numerical representation of the character data; providing, to a consolidated image-character based numerical representation generation model, the image-based numerical representation and the character-based numerical representation; generating, by the consolidated image-character based numerical representation generation model, a combined image-character based numerical representation of the candidate document.

In some embodiments, the method further comprises: comparing the combined image-character based numerical representation of the candidate document with an index of combined image-character based numerical representations, each combined image-character based numerical representations of the index being indicative of a respective document having a first attribute value; determining a combined image-character based numerical representation of the index that substantially corresponds with the combined image-character based numerical representation of the candidate document; and associating the candidate document with the first attribute value of the determined combined image-character based numerical representation of the index. The first attribute value may be an entity identifier, for example.

The respective document of each combined image-character based numerical representation of the index may have a second attribute value, and associating the candidate document with the first attribute value of the determined combined image-character based numerical representation of the index may further comprise associating the candidate document with the second attribute value of the determined combined image-character based numerical representation of the index. For example, the second attribute value may be a document type indicator.

In some embodiments, comparing the combined image-character based numerical representation of the candidate document with an index of combined image-character based numerical representations may comprise determining a similarity metric indicating substantial correspondence between the numerical representation of the candidate document with each record of the index of combined image-character based numerical representations. The similarity metric may be determined based on euclidean distance metric or cosine similarity metric.

The image-based numerical representation generation model, character-based numerical representation generation model and consolidated image-character based numerical representation generation model may each comprise a neural network trained to generate the respective numerical representations. The image-based numerical representation generation model comprises a depthwise convolutional neural network to generate the image-based numerical representation of the image data. The character-based numerical representation generation model may comprise a transformer based neural network to generate the character-based numerical representation of the image data.

In some embodiments, the image-based numerical representation generation model, the character-based numerical representation generation model and the consolidated image-character based numerical representation generation model may be trained using end-to-end learning.

In some embodiments, image data comprises pixel data extracted from an image of the candidate document. The character data may comprise character data extracted by performing optical character recognition on the image of the candidate document. The candidate document may be an accounting document and the first attribute value is indicative of an originator of the accounting document.

The image-based numerical representation generation model, character-based numerical representation generation model and consolidated image-character based numerical representation generation model may be trained using an objective function configured to maximise a similarity metric between numerical representations of training documents with identifier common set of attributes. The objective function may be further configured to minimise the similarity metric between numerical representations of training documents with different class identifiers. The objective function may comprise a multi-class N-tuple loss function.

Some embodiments relate to a method comprising: determining a plurality of example documents, each example document being a unique example document associated with a set of attributes; for each of the example documents: extracting the image data and the character data from the document; providing, to an image-based numerical representation generation model, the image data; generating, by the image-based numerical representation generation model, an image-based numerical representation of the image data; providing, to a character-based numerical representation generation model, the character data; generating, by the character-based numerical representation generation model, a character-based numerical representation of the character data; providing, to a consolidated image-character based numerical representation generation model, the image-based numerical representation and the character-based numerical representation; generating, by the consolidated image-character based numerical representation generation model, a combined image-character based numerical representation of the document; and labelling the combined image-character based numerical representation of the document with the at least first attribute; and collating the combined image-character based numerical representations for the plurality of example documents into an index of numerical representations.

Some embodiments relate to a system comprising: one or more processors; and memory comprising computer executable instructions, which when executed by the one or more processors, cause the system to perform any one of the described methods.

Some embodiments relate to a computer-readable storage medium storing instructions that, when executed by a computer, cause the computer to perform any one of the described methods.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF DRAWINGS

Various ones of the appended drawings merely illustrate example embodiments of the present disclosure and cannot be considered as limiting its scope.

BRIEF DESCRIPTION OF DRAWINGS

Figure 1:
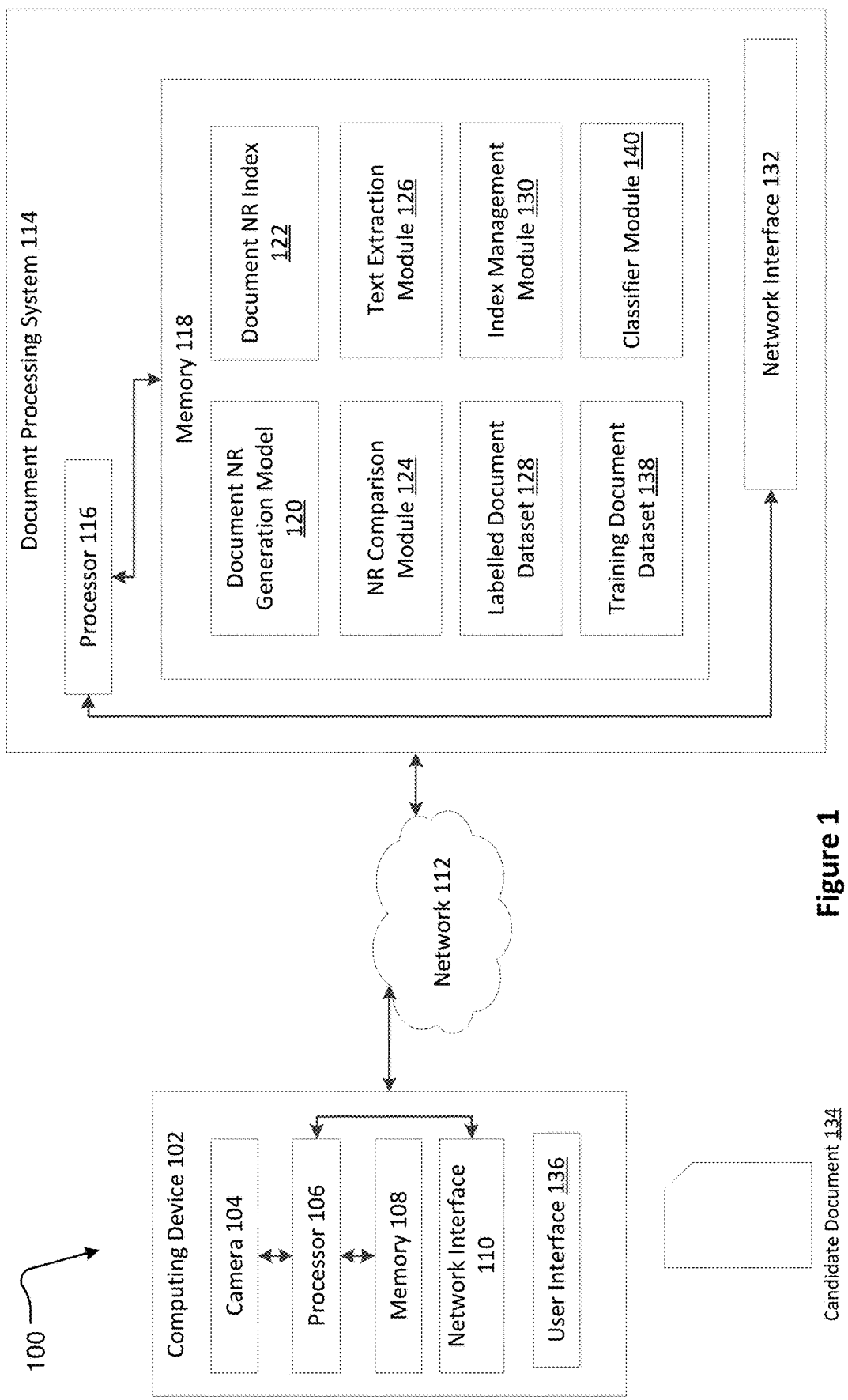
FIG. 1 is a schematic diagram of a system for generating numerical representations of a document, the system being in communication with one or more computing devices across a communications network, according to some example embodiments.

Embodiments generally relate to systems, methods and computer-readable media for generating numerical representations of documents. Some embodiments relate in particular to systems, methods and computer-readable media for determining or identifying attributes, such as entity identifiers, associated with documents using such numerical representations of documents.

Documents in the real world may be created using an automated process or a combination of automated processes and manual processes. For example, an invoice by a business may be created using a predefined template and manual population of the predefined template. Documents may include a printed matter, such as images, logos, printed text or formatting artefacts such as tables, lines or patterns. Documents may also include handwritten annotations. Businesses may have their distinct templates for creating documents. One business may have more than one distinct template for creating documents. For example, a business may have a first template used for creating invoices and a second template for creating quotes. Thus, there exists variability in the structure and overall appearance of documents created by businesses or organisations.

Despite the variability, the structure and overall appearance of documents includes relevant information about the documents. For example, since distinct businesses may use templates specific to their business for creating documents, the structure and overall appearance of documents may indicate the identity of the business that created the document. Similarly, if one business consistently uses two distinct templates for two distinct categories of documents, the structure and overall appearance of a document may be used to determine which category that particular document belongs to. Accordingly, relevant document attributes may be extracted by an analysis of the structure and overall appearance of a document. It may therefore be possible to derive or determine a document fingerprint indicative of a type or class of document associated with a business. A document fingerprint may be a numerical representation that embodies unique characteristics or traits of a particular class of documents having a common label or attribute. Just as a human fingerprint is unique for a human, a document fingerprint may be used to distinctly identify a class of documents sharing a particular characteristic or trait, such as an originator or issuer of the document or particular distinctive aspects regarding the structure and overall appearance of the document.

To analyse the structure and overall appearance of a document, a numerical representation of a document that could be automatically processed is generated to determine one or more attributes associated with the document. While the structure and overall appearance of a document may be described by a human after visual inspection, generating a numerical representation that encapsulates the various aspects of the structure and overall appearance of a document is not possible by a mere visual inspection. As the universe of documents under consideration grows, for example a collection of millions of documents, the task of generating a numerical representation of each document also becomes more computationally complex.

The described embodiments provide methods, systems and computer-readable media for determining numerical representations of documents that are computationally feasible for application to a large variety of documents that are part of a universe of a large number of documents. The numerical representations determined by the embodiments concisely encapsulate information regarding the documents, including information regarding the structure and overall appearance of the documents. The numerical representations determined by the embodiments may be in the form of a lower dimension embedding that can be more computationally efficiently processed to determine one or more attributes related to the document. The embodiments eliminate the need for visual inspection by a human to determine one or more attributes related to a document. The embodiments provide a scalable and computationally efficient methodology for generating numerical representations and determining document attributes based on the numerical representation.

FIG. 1 is a schematic diagram of a system 100 for generating numerical representations of a document in communication. The system 100 comprises a document processing system 114.

The system 114 comprises one or more processors 116 and memory 118 storing instructions (e.g. program code) which when executed by the processor(s) 116 causes the system 114 to perform computation or communicate with the computing device 102 and/or to function according to the described methods. The processor(s) 116 may comprise one or more microprocessors, central processing units (CPUs), application specific instruction set processors (ASIPs), application specific integrated circuits (ASICs) or other processors capable of reading and executing instruction code.

Memory 118 may comprise one or more volatile or non-volatile memory types. For example, memory 118 may comprise one or more of random access memory (RAM), read-only memory (ROM), electrically erasable programmable read-only memory (EEPROM) or flash memory. Memory 118 is configured to store program code accessible by the processor(s) 116. The program code comprises executable program code modules. In other words, memory 118 is configured to store executable code modules configured to be executable by the processor(s) 116. The executable code modules, when executed by the processor(s) 116 cause the system 114 to perform certain functionality, as described in more detail below.

The system 114 further comprises a network interface 132 to facilitate communications with components of the system 100 across the communications network 112, such as the computing device(s) 102. The network interface 132 may comprise a combination of network interface hardware and network interface software suitable for establishing, maintaining and facilitating communication over a relevant communication channel.

The computing device(s) 102 comprise one or more processors 106 and memory 108 storing instructions (e.g. program code) which when executed by the processor(s) 106 causes the computing device(s) 204 to cooperate with the system 114 to provide functionality to users of the computing device(s) 102 and/or to function according to the described methods. To that end, and similarly to the system 114, the computing devices 102 comprise a network interface 110 to facilitate communication with the components of the communications network 112. For example, memory 108 may comprise a web browser application (not shown) to allow a user to engage with the system 114.

The computing device 102 comprises a user interface 136 whereby one or more user(s) can submit requests to the computing device 102, and whereby the computing device 102 can provide outputs to the user. The user interface 136 may comprise one or more user interface components, such as one or more of a display device, a touch screen display, a keyboard, a mouse, a camera, a microphone, buttons, switches and lights. The computing device 102 also comprises a camera 104 to obtain images of a candidate document 134 for processing by the system 100. An image of the candidate document 134 may be obtained using the camera 104. The obtained image may be transmitted to the document processing system 114 over the network 112.

The network 112 may include, for example, at least a portion of one or more networks having one or more nodes that transmit, receive, forward, generate, buffer, store, route, switch, process, or a combination thereof, etc. one or more messages, packets, signals, some combination thereof, or so forth. The network 112 may include, for example, one or more of: a wireless network, a wired network, an internet, an intranet, a public network, a packet-switched network, a circuit-switched network, an ad hoc network, an infrastructure network, a public-switched telephone network (PSTN), a cable network, a cellular network, a satellite network, a fibre-optic network, some combination thereof, or so forth.

The system 114 may also be arranged to communicate with third-party servers or systems (not shown), to receive records or documents associated with computations being performed by the system 114. For example, the third-party servers or systems (not shown), maybe a financial institution server(s) or other third-party financial systems and the system 114 may be configured to receive documents from the third-party servers or systems. For example, where the system 114 is part of an accounting system, the system 114 may be arranged to receive invoices or credit notes or receipts associated with transactions to be reconciled from third party entities.

Memory 118 comprises a document numerical representation generation model 120, which when executed by the processors(s) 116, causes the system 114 to determine a numerical representation of a document. The document numerical representation or embedding, or "fingerprint" may be used to readily identify one or more attributes, such as an entity from which the document originated, or by which the document was generated or issued—i.e. the originator of the document, and in some embodiments a class or type of document of that entity. The document numerical representation generation model 120 comprises several sub-modules or sub-models described with reference to FIG. 2.

Memory 118 comprises a document numerical representation index (NR index) 122, which comprises an index data structure. The index data structure comprises numerical representations and associated attribute(s) of documents from a index document dataset 128. The index document dataset 128 comprises documents with labelled attribute information. For example, the index document dataset 128 may have been prepared by manual annotation of documents with label(s) indicative of respective attribute(s) of the documents and serves to seed the document numerical representation index 122 with high-quality information regarding known documents and their respective known document attribute(s).

Memory 118 may also comprise a training document dataset 138 comprising documents. In some embodiments, the documents of the training document dataset 138 are labelled or annotated with attribute information. The attribute information may not necessarily be quality assured and there may not be a high degree of confidence associated with the accuracy of the labels. For example, one or more attributes of the various documents in the training document dataset 138 may have been inferred using a classifier module 140, as discussed below with reference to FIG. 5. In other embodiments, the documents may be annotated or labelled with human provided labels to indicate the one or more attributes. The labels or attributes of the training document dataset 138 may be used for the training of the document numerical representation generation model 120, as described below, again with reference to FIG. 5. The training document dataset 138 may be significantly larger than the index document dataset 128. The larger training document dataset 138 may provide an ample number of documents or records for adequate training of the document numerical representation generation model 120, while the smaller but more accurate index document dataset 128 may provide a sufficiently high quality dataset for generation of the document numerical representation index 122.

Memory 118 comprises a numerical representation comparison module 124. The numerical representation comparison module 124, when executed by the processors(s) 116, causes the system 114 to compare a numerical representation generated by the numerical representation generation model 120 with the numerical representations of the document numerical representation index 122. As an output of the comparison, the numerical representation comparison module 124 may generate a similarity metric or a difference metric that quantifies how similar or different two document numerical representations are. The similarity or difference metric may be based on Euclidean distances or cosine similarity, for example. The similarity metrics may be used to identify a record in the document numerical representation index 122 that is closest to the numerical representation of candidate document 134.

Memory 118 comprises a character or text extraction module 126. The text extraction module 126, when executed by the processors(s) 116, causes the system 114 to process an image of the candidate document 134 and extract characters or text from the candidate document 134. The text extracted from the candidate document 134 may be used as a separate input to the document numerical representation generation model 120, and specifically to a character-based numerical representation generation model (text processing head) 220 (FIG. 2) of the document numerical representation generation model 120. The text extraction module 126 may comprise program code implementing optical character recognition techniques to parse through an image of the candidate document 134 and extract all or part of the text present in the image.

Memory 118 may comprise an index management module 130. The index management module 130 when executed by the processors(s) 116, causes the system 114 to create or update the document numerical representation index 122 based on the index document dataset 128. An update of the document numerical representation index 122 may comprise the addition of new records to the document numerical representation index 122 or a change to existing records.

Memory 118 may comprise the classifier module 140. The classifier module 140, when executed by the processors(s) 116, may cause the system 114 to determine one or more attributes of documents, such as entity identifiers. The classifier module 140 may be a machine learning model that is trained to receive, as an input, an image of a document and generate, as output, one or more labels associated with the document. The labels may be indicative of attributes of the document, such as entity identifiers. In some embodiments, the classifier module 140 may also be trained to generate a confidence score associated with each determined label of a document. In some embodiments, the classifier module 140 may also be trained to generate coordinates defining a data block region of the document associated with each determined label. The classifier module 140 may incorporate an image processing module to determine a data block region in an image of a document, a character recognition module to extract characters or text from each determined data block and a natural language processing module to process the extracted text and determine the labels. The classifier module 140 may be trained using a training dataset comprising documents with annotations identifying one or more labels corresponding to the document. The labels may relate to a vendor identifier, a transaction date, a transaction amount, a transaction currency, for example. In some embodiments, the classifier module 140 may incorporate an 'Adam' based neural network optimiser described in the paper titled 'Adam: A Method for Stochastic Optimization' available at https://arxiv.org/abs/1412.6980. In some embodiments, the classifier module 140 may comprise model(s) described in PCT application no. PCT/AU2020/051140, entitled "Docket Analysis Methods and Systems", and filed on 22 Oct. 2020, the entire content of which is incorporated herein by reference.

Figure 2:
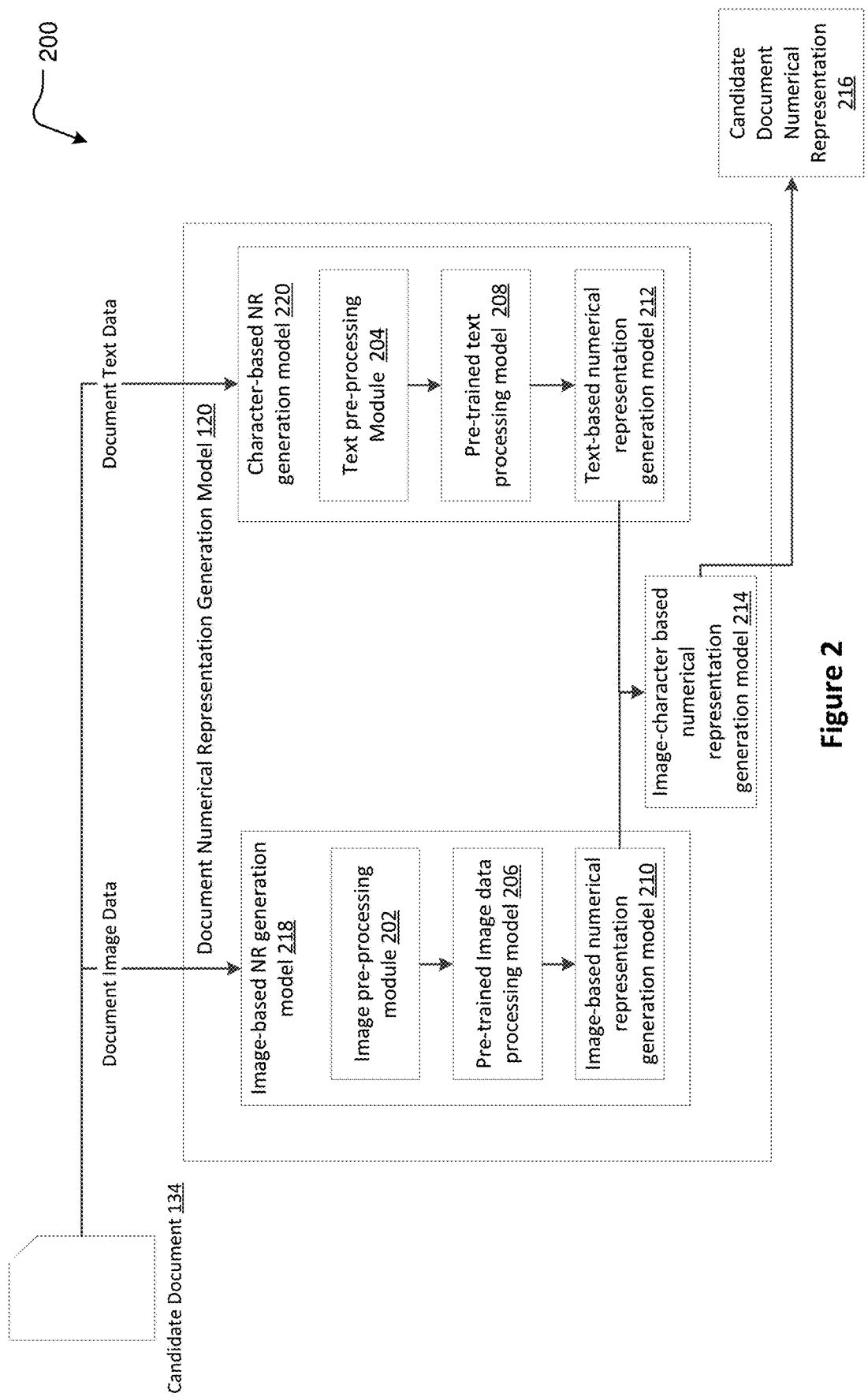
FIG. 2 is a schematic diagram of a document numerical representation generation model of the system of FIG. 1, according to some example embodiments.

FIG. 2 is a schematic diagram of a document numerical representation generation model 120, according to some example embodiments. The document numerical representation generation model 120 comprises two heads or pipelines; an image-based numerical representation generation model (image processing head) 218 and a character-based numerical representation generation model (text processing head) 220. The image processing head 218 comprises an image-based numerical representation generation model 210. The image processing head 218 may also comprise an image pre-processing module 202 and/or a pre-trained image processing model 206. The text or character processing head 220 comprises a text or character-based numerical representation generation model 212. The text or character processing head 220 may also comprise a text or character pre-processing module 204 and/or a pre-trained text or character processing model 208. The document numerical representation generation model 120 may also comprise an image-character based numerical representation generation model 214 that processes and combines or concatenates the numerical representations generated by both the image processing head 218 and the text processing head 220 to generate a candidate document numerical representation 216.

The image pre-processing module 202 receives as input an image file or image data corresponding to candidate document 134. The image pre-processing module 202 comprises program code which when executed by the processor 116 performs pre-processing operations on the image data corresponding to the candidate document 134. The image pre-processing operations may include: resizing of the image to a predefined size, or de-noising the image using, for example, a Gaussian blur function, or normalisation of the pixel intensity values of the image. In some embodiments, the image may be standardised to the size 299×299×3.

The pre-processing operations may standardise the image data providing consistency in the input for the rest of the elements of the image processing head 218. The consistency in image data addresses the variability in the way images of candidate document 134 may be captured by camera 104 of client device 102. The consistency in image data also improves the accuracy of the numerical representation generated by the document numerical representation generation model 120.

In some embodiments, the pre-processed image data is provided as an input to the pre-trained image data processing model 206. The pre-trained image data processing model 206 may include a model that is pre-trained using publically available datasets to transform image data into a lower dimension numerical representation. In some embodiments, the Xception model (Deep Learning with Depthwise Separable Convolutions, Francois Chollet; Proceedings of the IEEE Conference on Computer Vision and Pattern Recognition (CVPR), 2017, pp. 1251-1258) may be used as part of the pre-trained image data processing model 206. The pre-trained image data processing model 206 may be swapped or upgraded with alternative pre-trained models.

Output of the pre-trained image data processing model 206 may be provided as input to the image-based numerical representation generation model 210. The image-based numerical representation generation model 210 is specifically trained using the documents from the training document dataset 138. In some embodiments, the image-based numerical representation generation model 210 comprises one or more neural networks. The neural network of the image-based numerical representation generation model 210 may comprise a convolutional neural network (CNN) and a dense neural network.

A CNN comprises an input and an output layer, and multiple hidden layers. The hidden layers of a CNN typically consist of a series of convolutional layers that convolve input image data corresponding to the candidate document 134. A CNN may use a rectified linear unit (ReLU) as an activation function, which may be followed by additional convolutions such as pooling layers, fully connected layers and normalization layers. A dense neural network comprises multiple layers of neurons wherein each neuron of a subsequent layer is connected to (receives input from) each neuron of a consequent layer in the dense neural network. A dense neural network may also be referred to as a fully connected neural network.

The output of the image-based numerical representation generation model 210 is concatenated with the output of the text-based numerical representation generation model 212 and provided as an input to the image-character based numerical representation generation model 214.

The text or character pre-processing module 204 may receive as input text or character string data extracted from the candidate document 134. The text may comprise a series of strings, numbers or characters extracted by the text extraction module 126. The text pre-processing module 204 comprises program code which, when executed by the processor 116, performs pre-processing operations on text data corresponding to the candidate document 134. The text pre-processing operations may include: converting the entire text to lowercase, stemming or lemmatization of the text, removal of stop words from the text or other normalisation operations of the text extracted from the candidate document 134.

The text pre-processing operations may standardise the text or string data providing consistency in the input for the rest of the elements of the text processing head 220. The consistency in text data improves the accuracy of the numerical representation generated by the document numerical representation generation model 120.

The pre-processed text data may be provided as an input to the pre-trained text processing model 208. The pre-trained text processing model 208 may include a model that is pre-trained using publicly available datasets to transform a text or a series of strings into a lower dimension numerical representation. In some embodiments, the Bidirectional Encoder Representations from Transformer (BERT: Pre-training of Deep Bidirectional Transformers for Language Understanding, Google AI Language) based model may be used as part of the pre-trained text processing model 208. The pre-trained text processing model 208 may be swapped or upgraded with alternative pre-trained models.

The output of the pre-trained text processing model 208 may be provided as input to the text-based numerical representation generation model 212. The text-based numerical representation generation model 212 may be specifically trained using the documents from the training document dataset 138. In some embodiments, the text-based numerical representation generation model 212 comprises one or more neural networks. The neural network of the text-based numerical representation generation model 212 may comprise a CNN and a dense neural network.

The output of the text-based numerical representation generation model 212 is concatenated with the output of the image-based numerical representation generation model 210 and provided as an input to the image-character based numerical representation generation model 214. In some embodiments, the output of each of the text-based numerical representation generation model 212 and the image-based numerical representation generation model 210 may be in the form of a vector of 128 dimensions.

The image-character based numerical representation generation model 214 may comprise a neural network trained to generate a consolidated numerical representation 216 of the candidate document 134. The neural network of the image-character based numerical representation generation model 214 includes a dense neural network. In some embodiments, the image-character based numerical representation generation model 214 may receive an input in the form of a vector of 256 dimensions and may produce an output in the form of a 128 dimension vector.

In some embodiments, the image-character based numerical representation generation model 214, text-based numerical representation generation model 212 and the image-based numerical representation generation model 210 may be jointly trained using an end-to-end training methodology.

End-to-end training may comprise determining an error using an objective function or a loss function based on the output produced by the output layer of neurons of the image-character based numerical representation generation model 214. A categorical cross-entropy loss function may be used in some embodiments. In some embodiments, the document numerical representation generation model 120 is trained to recognise numerical representations of documents with the same attributes as being similar, and numerical representations of documents with the different attributes as being dissimilar. In some embodiments, the training method described in the Applicant's co-pending Australia provisional patent application No. 2021900420, entitled "Systems and methods for training models", filed on 18 Feb. 2021, the entire content of which is incorporated herein by reference, may be employed, as described in more detail below.

The calculated error may be back-propagated through the various layers of neurons in the image-character based numerical representation generation model 214. Back-propagation of the error may include calculation of error gradients at each stage and adjustment of the weights of each layer of neurons based on the calculated error gradients. The back-propagation may continue further through to the input layer of the image-character based numerical representation generation model 214 and then onto the output layers of the text-based numerical representation generation model 212 and the image-based numerical representation generation model 210. The back-propagation process may continue through the various layers of neurons in the text-based numerical representation generation model 212 and the image-based numerical representation generation model 210, wherein at each stage a gradient may be calculated and weight of the neurons may be adjusted through all the layers of neurons in the respective models.

Figure 3:
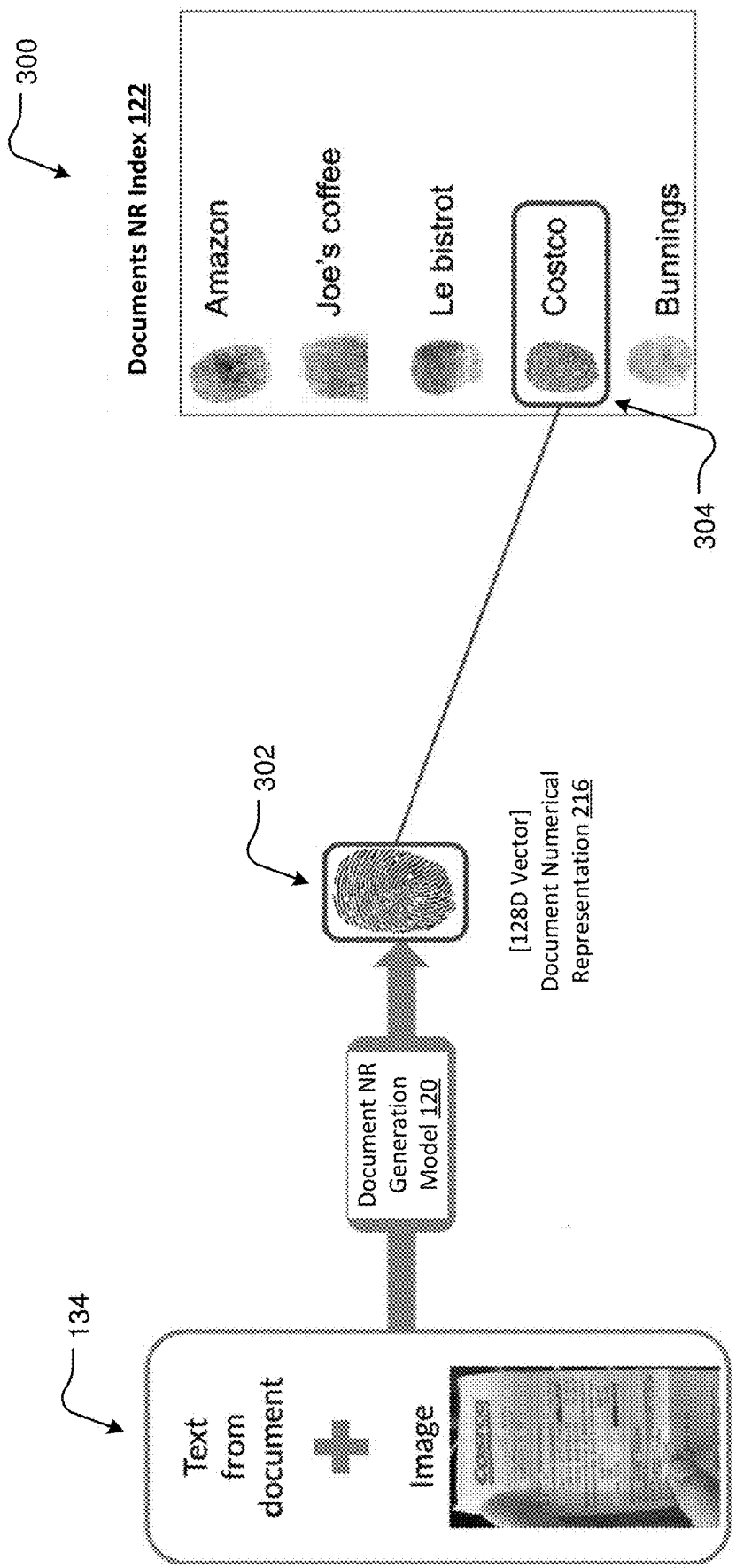
FIG. 3 is a schematic diagram illustrating the determination of a document fingerprint of a candidate document and comparison of the document fingerprint with a document fingerprint index, according to some example embodiments.

FIG. 3 is a schematic diagram of a process for generating numerical representations (fingerprint) of the candidate document 134 and determining an attribute associated with the document, according to some example embodiments. An image of the candidate document 134 and text extracted from the candidate document 134 may be processed by the document numerical representation generation model 120 to determine a numerical representation 216 of the candidate document. A fingerprint 302 in FIG. 3 illustrates that the numerical representation 216 is akin to a fingerprint of the candidate document 134 encoding the information regarding the overall structure and content of the candidate document 134. The numerical representation 216, being a vector, is capable of being compared with each record in the document numerical representation index 122 to find a matching fingerprint 304 (numerical representation). Each fingerprint (numerical representation) in the document numerical representation index 122 comprises additional attributes associated with the fingerprint (numerical representation). As illustrated in FIG. 3, one of the attributes associated with a document may be an identity of the issuer or originator of the document with the examples of Amazon, Joe's coffee, Le bistrot, Costco, and Bunnings. Because the fingerprint 302 of the candidate document 134 matched with the fingerprint 304, an inference may be made that the candidate document 134 has an attribute common to the attribute of the fingerprint 304. Accordingly, it may be inferred that the candidate document 134 was issued by business Costco.

Figure 4:
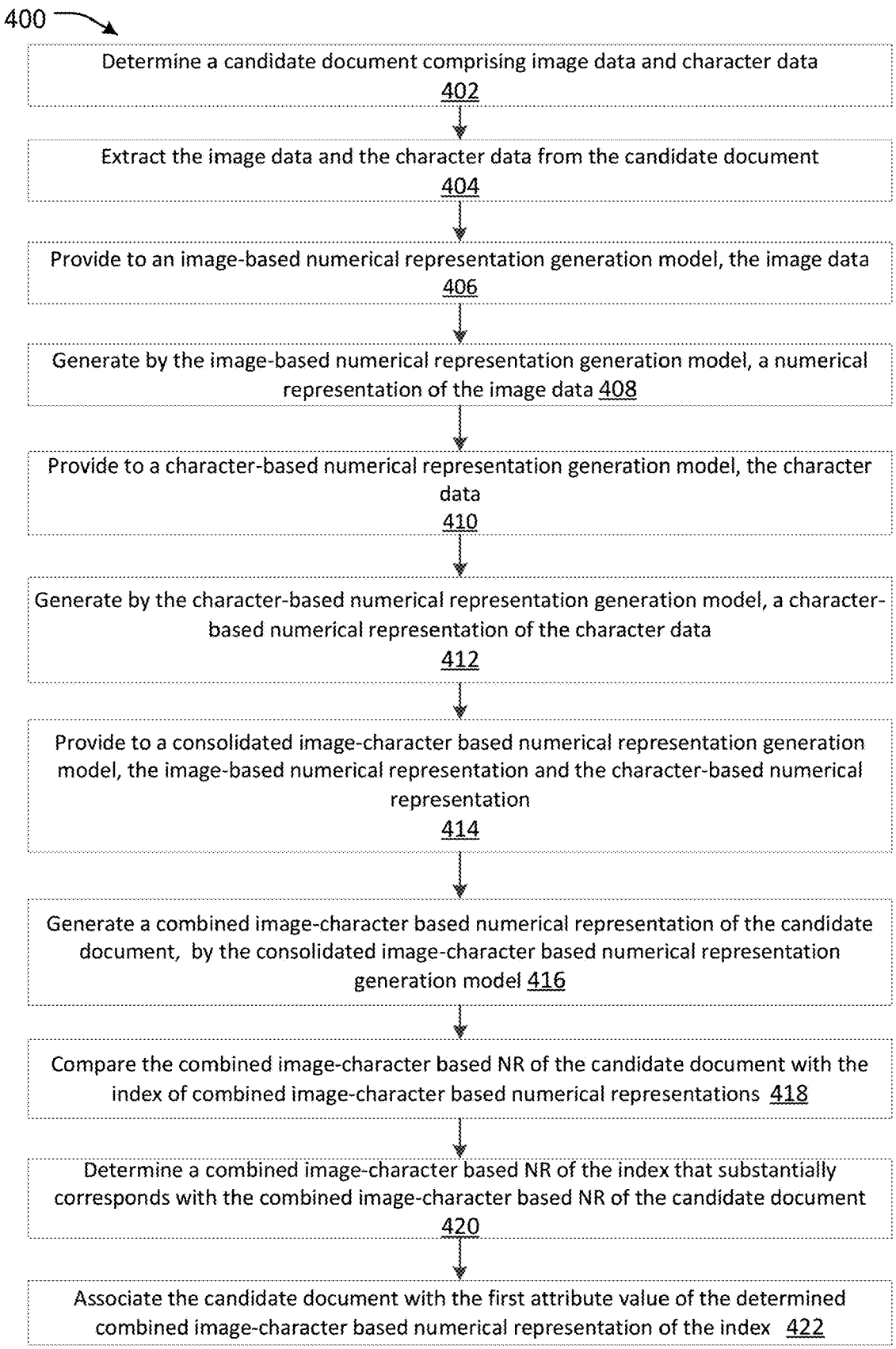
FIG. 4 is a process flow diagram of a method of generating document numerical representation and determining document attribute(s), according to some embodiments.

FIG. 4 is a process flow diagram of a method 400 of generating a document numerical representation and determining document attribute(s), according to some embodiments. The method 400 may, for example, be implemented by the processor(s) 116 of system 114 executing instructions stored in memory 118.

At 402, a candidate document 134 comprising image data and character data is determined by the document processing server 114. The candidate document 134 may be in the form of an image obtained using camera 104 of the computing device 102. In some embodiments, the candidate document 134 may be in the form of a computer file, such as Adobe™ PDF files or a Microsoft™ word file. In some embodiments, the candidate document 134 may be received from other third-party systems.

At 404, image data and character data is extracted from the candidate document 134. The text extraction may be performed by the text extraction module 126. If the candidate document 134 is not received in the form of an image, then the candidate document 134 may be transformed into an image for processing by the document numerical representation generation module 120 to generate a numerical representation of the image data.

At 406, the image data extracted at 404 is provided to the image-based numerical representation generation model 218 of the document numerical representation generation module 120. At 408, the image-based numerical representation generation model 218 processes the image data extracted at 404 to generate a numerical representation of the image data corresponding to the candidate document 134.

At 410, the character data generated at 404 is provided to the character-based numerical representation generation model 220. At 412, the character-based numerical representation generation model 220 generates a character-based numerical representation of the character data extracted from the candidate document 134.

At 414, the character-based numerical representation and the image-based numerical representation of the candidate document 134 are provided to the image-character based numerical representation generation model 214. The character-based numerical representation and the image-based numerical representation may be concatenated to provide input to the image-character based numerical representation generation model 214.

At 416, the image-character based numerical representation generation model 214 generates a combined image-character based numerical representation (fingerprint) of the candidate document 134. The image-character based numerical representation encodes or encapsulates a fingerprint of the candidate document 134 through a combined analysis and processing of both an image and the text extracted from the candidate document 134.

At 418, the image-character based numerical representation of the candidate document 134 is compared with records in the document numerical representation index 122 to determine one or more attributes of the candidate document 134. The comparison operation may involve the generation of a similarity metric or a probability score indicating the probability that a record in the document numerical representation index 122 and the candidate have a common or substantially similar fingerprint.

At 420, a combined image-character based numerical representation from the index that substantially corresponds with the combined image-character based numerical representation of the candidate document 134 is determined. This determined numerical representation from the index 122 that substantially corresponds with the combined image-character based numerical representation of the candidate document may be referred to as a matching index record.

The matching index record may be a record in the document numerical representation index 122 that is a closest match to the fingerprint of the candidate document 134 determined at 416. In some embodiments, if the similarity metric determined at 418 does not exceed a predefined minimum similarity metric threshold, then an inference may be made that the candidate document 134 does not have a matching fingerprint in the document numerical representation index 122. At 422, based on the matching index record determined at 420, the candidate document 134 may be associated with a first attribute value of the matching index record from the document numerical representation index 122. In some embodiments, the first attribute value may relate to an inferred document type indicator, or an identifier of a vendor or an issuer of the candidate document 134, for example.

Figure 5:
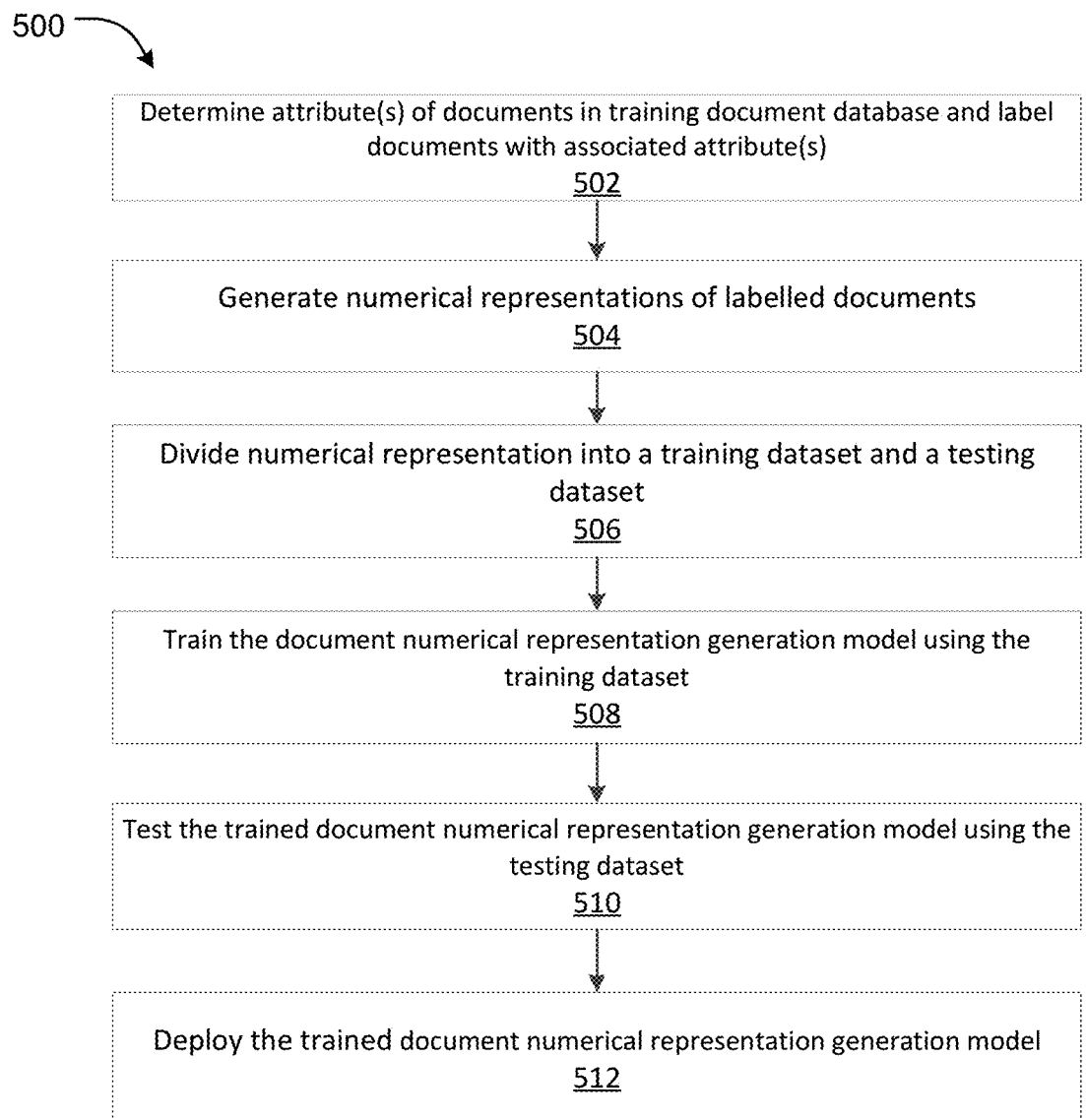
FIG. 5 is a process flow diagram of a method of training the document numerical representation model of FIG. 2, according to some embodiments.

FIG. 5 is a process flow diagram of a method 500 of training the document numerical representation generation model 120, according to some embodiments. The method 500 may, for example, be implemented by the processor(s) 116 of system 114 executing instructions stored in memory 118.

In some embodiments, documents in the training document database 128 are unlabelled. Accordingly, in some embodiments, at 502, one or more attributes associated with each document may be determined using the classifier module 140. For example, the one or more attributes may include an entity identifier. In some embodiments, the classifier module 140 may be trained to determine or infer one or more attributes associated with a document, and an associated confidence probability value for each of the one or more determined attributes. The numerical representation of the documents in the training document dataset 138 may be determined using the values of the one or more inferred attributes and the associated confidence probability values.

In some embodiments, the classifier module 140 may be implemented using a pre-trained machine learning classifier such as a TensorFlow Estimator, for example The classifier module 140 allows the generation of numerical representations or embeddings corresponding to documents in the training document dataset 138.

In some embodiments, numerical representations of the documents in the training document database 128 may be determined, potentially dimensionally reduced, and clustered to identify clusters of similar numerical representations, each indicative of a common attribute of the documents. For example, where the training document database 128 includes a single class of document for each entity, the clusters of numerical representations may be indicative of documents associated with the same entity, and which may then, for example, be labelled with that entity identifier. Where the training document database 128 includes multiple classes of documents for each entity, and the documents are labelled with entity information, the documents may be first organised into datasets for each entity, each dataset including all of the document of different types associate with that entity, and the clustering method may be performed on a dataset-by-dataset basis (i.e., for each entity), with clusters of numerical representations being indicative of the types of documents of that entity. Classes may be specific in that all document associated with a class may be of a particular type, such as a receipt, an invoice or a credit note, or maybe more generic and relate to a particular category such as financial documents, which may include documents of different types classified as belonging to the category. For example, a category may be financial documents, advertisements or personal correspondence, whereas a type of document may be a subset of a category such as receipt, an invoice, credit note, etc. Further details of such refining and clustering of numerical representations of documents is disclosed in the Applicant's co-pending Australian provisional application No. 2021900421, entitled "Systems and methods for generating labelled datasets", filed on 18 Feb. 2021 the entire content of which is incorporated herein by reference.

At 504, numerical representations of the labelled documents of the training document dataset 138 are generated using the document numerical representation generator 120. Where multiple document types for each entity are present, a numerical representation or "fingerprint" is generated for each document type.

In some embodiments, at 506, the numerical representations determined at 504 are divided into a training dataset (not shown) and a testing dataset (no shown) to allow for training and testing of the document numerical representation generator 120.

At 508, the document numerical representation generation model 120 is trained. In some embodiments, the document numerical representation generation model 120 is trained using the training datasets defined at 506. The document numerical representation generation model 120 is trained to recognise numerical representations of documents with the same attributes as being similar, and numerical representations of documents with the different attributes as being dissimilar. In some embodiments, an n-tuple loss based loss function may be used to train the document numerical representation generation model 120.

In some embodiments, a training process incorporating the loss function described in Applicant's co-pending Australia provisional patent application No. 2021900420, entitled "Systems and methods for training models", filed on 18 Feb. 2021, the entire content of which is incorporated herein by reference. For example, the training process may involve determining a batch of training data for training a model, the training data comprising a plurality of datasets, each dataset associated with a label and comprising at least one numerical representation of an example document. A number of classes of labels in the batch may be determined, wherein each class is associated with a unique attribute value. A number of numerical representations associated with each class in the batch may be determined. For each numerical representation in each dataset, (i) a first similarity measure indicative of the similarity of the numerical representation to the other first numerical representations associated with a same class may be determined; (ii) a second similarity measure for each of the other datasets associated with a different respective class in the batch may be determine, wherein each second similarity measure indicative of the similarity of the numerical representation to each of the at least one numerical representations of the respective other datasets associated with respective different classes of the batch; (iii) a difference measure as a function of the first similarity measure and the one or more second similarity measures may be determined; and (iv) a normalised difference measure by dividing the difference measure by the number of example documents associated with the same class of the dataset may be determined. The training process may then comprises determining a loss value as a function of the normalised difference measures of the example documents in the batch. In some embodiments, determining the loss value comprises may comprise summing the normalised difference measures of the numerical representations in the batch and dividing by the number of classes. In some embodiments, determining the loss value comprises summing the normalised difference measures of the numerical representations in the batch and dividing by the number of classes that have a dataset with at least one numerical representation.

At 510, once the document numerical representation generation model 120 has been trained on the training dataset, the trained numerical representation generation model 120 may be tested using the testing dataset (not shown).

At 512, the trained document numerical representation generation model 120 may be deployed and used for generating numerical representations of example labelled documents for use as an index, as described in more detail below with reference to FIG. 6, or to generate numerical representations of candidate documents, with which to compare to the index to determine document attributes, as described above with reference to FIG. 4.

Figure 6:
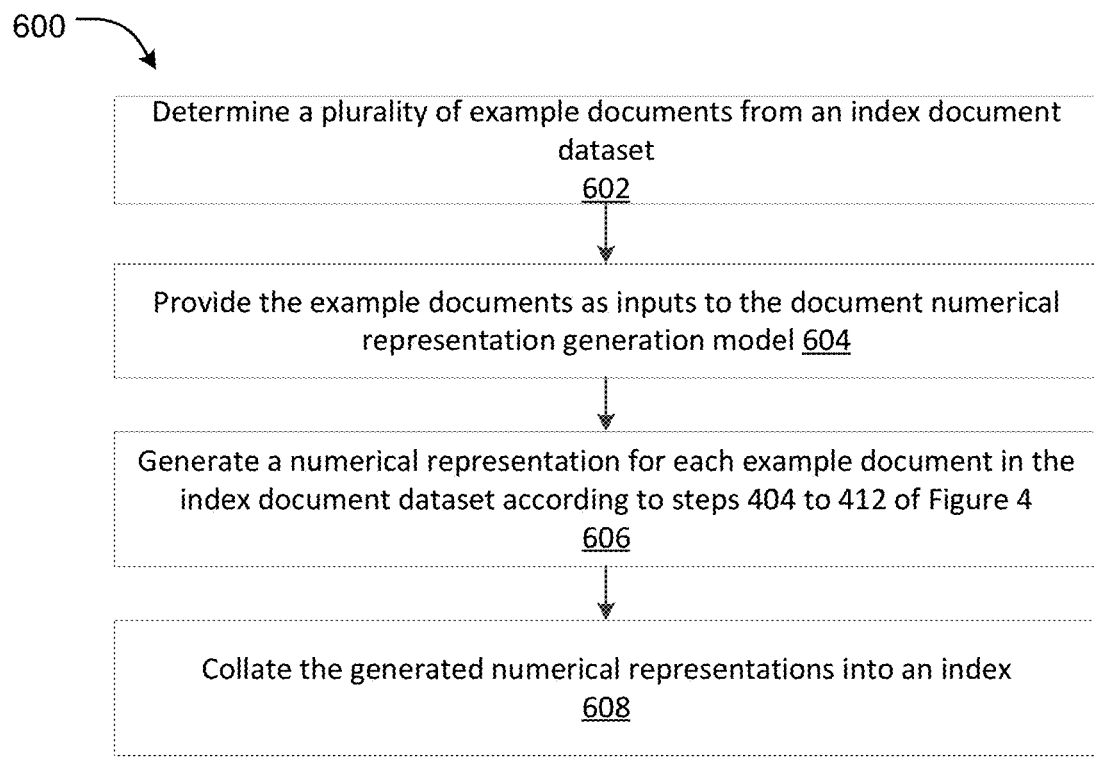
FIG. 6 is a process flow diagram of a method of generating an index of numerical representations of labelled documents, according to some embodiments.

FIG. 6 is a process flow diagram of a method of generating an index of numerical representations according to some embodiments. The method 600 may, for example, be implemented by the processor(s) 116 of system 114 executing instructions stored in the index management module 130 provided in memory 118.

The document numerical representation index 122 may include a plurality of numerical representations, each associated with an attribute value. For example, the attribute value may be an entity identifier. In some embodiments, each numerical representation is associated with a first attribute and a second attribute, which may be a subclass or subcategory of the first attribute. For example, the index 122 may include a plurality of numerical representations for a given entity, each numerical representation representing a particular type or class of document (e.g., receipt, invoice, credit note etc.) associated or originating with the given entity. The index document dataset 128 may include a single example document for each combination of attributes. For example, the index document dataset 128 may include a single example document of an invoice generated by Xero, Ltd, and a single example document of a receipt generated by Xero, Ltd.

At 602, a plurality of example documents are determined from the index document dataset 138 and at 604, are provided as inputs to the document numerical representation generation model 120. Each example document may be a unique example document associated with a set of attributes. The set of attributes may comprise one or more attributes. For example, the one or more example documents may have at least a first label indicative of a first attribute value of the respective document. For example, the first attribute value may be an entity identifier. In some embodiments, the example document(s) have a second label indicative of a second attribute value of the respective document. For example, the second attribute value may be a document type identifier. The example documents are retrieved from the index document database 128 and are labelled with attribute information. In some embodiments, the labels are human-provided and are quality assured or controlled. The index document dataset 128 therefore serves to seed the document numerical representation index 122 with high-quality numerical representations of the example documents for each attribute.

At 606, the document numerical representation generation model 120 generates a numerical representation for each example document in the index document dataset 128, with each numerical representation being labelled with its associated attribute value(s). For example, the document numerical representation generation model 120 may generate a numerical representation for each example document according to steps 404 to 412 of method 400 of FIG. 4.

At 608, the index management module 130 collates the generated numerical representations of the example documents into the document numerical representation index 122 for querying by the numerical representation comparison module 124 when seeking to determine or identify attributes of candidate documents, as discussed in method 400 with respect to FIG. 4.

"Fingerprints" or numerical representations of documents in the document numerical representation index 122 allows for a computationally efficient comparison of a numerical representation of the candidate document generated by the document numerical representation generation model 120 to determine attribute(s) of the candidate documents. Generating a statistically sound and informative document numerical representation index 122 allows for accurate determination of attribute(s) associated with candidate documents.

In some embodiments, the document numerical representation index data structure 122 may be implemented using the Facebook™ AI Similarity Search (Faiss). Faiss includes a library that allows computationally efficient searching and/or comparison of numerical representations.

The attributes or numerical representations determined using the systems, methods and computer-readable media for generating numerical representation of documents according to the embodiments may be used in many applications, including for example, for data or transaction reconciliation. In some embodiments, the attributes determined may be transmitted to or may be made accessible to an accounting system (not shown) or a system (not shown) for storing, manipulating and/or reconciling accounting data. The extracted information, such as a vendor or originator or issuer name or identity, may be used within the accounting system (not shown) to reconcile a transaction associated with the candidate document with one or more accounting records in the accounting system (not shown). The embodiments accordingly allow efficient and accurate extraction, tracking and reconciliation of transactional data associated with documents by automatically extracting transaction information from the documents and making it available to an accounting system (not shown) for reconciliation. The embodiments may also allow the extraction of transaction information from documents associated with expenses by individuals in an organisation. The extracted information may be transmitted or made available to an expense claim tracking system to track, approve and process expenses by individuals in an organisation.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

That which is claimed is:

1. A method comprising:
   determining a candidate document comprising image data and character data;
   extracting the image data and the character data from the candidate document;
   providing, to an image-based numerical representation generation model, the image data;
   generating, by the image-based numerical representation generation model, an image-based numerical representation of the image data;
   providing, to a character-based numerical representation generation model, the character data;
   generating, by the character-based numerical representation generation model, a character-based numerical representation of the character data;
   providing, to a consolidated image-character based numerical representation generation model, the image-based numerical representation and the character-based numerical representation;
   generating, by the consolidated image-character based numerical representation generation model, a combined image-character based numerical representation of the candidate document;
   comparing the combined image-character based numerical representation of the candidate document with an index of combined image-character based numerical representations, each combined image-character based numerical representations of the index being indicative of a respective document having a first attribute value;
   determining a combined image-character based numerical representation of the index that substantially corresponds with the combined image-character based numerical representation of the candidate document; and
   associating the candidate document with the first attribute value of the determined combined image-character based numerical representation of the index;
   wherein the image-based numerical representation generation model, the character-based numerical representation generation model and the consolidated image-character based numerical representation generation model are trained using an objective function configured to maximise a similarity metric between numerical representations of training documents with an identifier common set of attributes.

2. The method of claim 1, wherein the first attribute value is an entity identifier.

3. The method of claim 1, wherein the respective document of each combined image-character based numerical representation of the index has a second attribute value, and wherein associating the candidate document with the first attribute value of the determined combined image-character based numerical representation of the index further comprises associating the candidate document with the second attribute value of the determined combined image-character based numerical representation of the index.

4. The method of claim 3, wherein the second attribute value is a document type indicator.

5. The method of claim 1, wherein comparing the combined image-character based numerical representation of the candidate document with an index of combined image-character based numerical representations comprises determining a similarity metric indicating substantial correspondence between the numerical representation of the candidate document with each record of the index of combined image-character based numerical representations.

6. The method of claim 5, wherein the similarity metric is determined based on euclidean distance metric or cosine similarity metric.

7. The method of claim 1, wherein the image-based numerical representation generation model, character-based numerical representation generation model and consolidated image-character based numerical representation generation model each comprise a neural network trained to generate the respective numerical representations.

8. The method of claim 1, wherein the image-based numerical representation generation model comprises a depthwise convolutional neural network to generate the image-based numerical representation of the image data.

9. The method claim 1, wherein the character-based numerical representation generation model comprises a transformer based neural network to generate the character-based numerical representation of the image data.

10. The method of claim 1, wherein the image-based numerical representation generation model, the character-based numerical representation generation model and the consolidated image-character based numerical representation generation model are trained using end-to-end learning.

11. The method of claim 1, wherein the image data comprises pixel data extracted from an image of the candidate document.

12. The method of claim 1, wherein the character data comprises character data extracted by performing optical character recognition on the image of the candidate document.

13. The method of claim 1, wherein the candidate document is an accounting document and the first attribute value is indicative of an originator of the accounting document.

14. The method of claim 1, wherein the objective function is further configured to minimise the similarity metric between numerical representations of training documents with different class identifiers.

15. The method of claim 1, wherein the objective function comprises a multi-class N-tuple loss function.

16. A system comprising:
one or more processors; and
memory comprising computer executable instructions, which when executed by the one or more processors, cause the system to:
determine a candidate document comprising image data and character data;
extract the image data and the character data from the candidate document;
provide, to an image-based numerical representation generation model, the image data;
generate, by the image-based numerical representation generation model, an image-based numerical representation of the image data;
provide, to a character-based numerical representation generation model, the character data;
generate, by the character-based numerical representation generation model, a character-based numerical representation of the character data;
provide, to a consolidated image-character based numerical representation generation model, the image-based numerical representation and the character-based numerical representation;
generate, by the consolidated image-character based numerical representation generation model, a combined image-character based numerical representation of the candidate document;
compare the combined image-character based numerical representation of the candidate document with an index of combined image-character based numerical representations, each combined image-character based numerical representations of the index being indicative of a respective document having a first attribute value;
determine a combined image-character based numerical representation of the index that substantially corresponds with the combined image-character based numerical representation of the candidate document; and
associate the candidate document with the first attribute value of the determined combined image-character based numerical representation of the index;
wherein the image-based numerical representation generation model, the character-based numerical representation generation model and the consolidated image-character based numerical representation generation model are trained using an objective function configured to maximise a similarity metric between numerical representations of training documents with an identifier common set of attributes.

17. A non-transitory computer-readable storage medium storing instructions that, when executed by a computer, cause the computer to perform operations including:
determining a candidate document comprising image data and character data;
extracting the image data and the character data from the candidate document;
providing, to an image-based numerical representation generation model, the image data;
generating, by the image-based numerical representation generation model, an image-based numerical representation of the image data;
providing, to a character-based numerical representation generation model, the character data;
generating, by the character-based numerical representation generation model, a character-based numerical representation of the character data;
providing, to a consolidated image-character based numerical representation generation model, the image-based numerical representation and the character-based numerical representation;
generating, by the consolidated image-character based numerical representation generation model, a combined image-character based numerical representation of the candidate document;
comparing the combined image-character based numerical representation of the candidate document with an index of combined image-character based numerical representations, each combined image-character based numerical representations of the index being indicative of a respective document having a first attribute value;

determining a combined image-character based numerical representation of the index that substantially corresponds with the combined image-character based numerical representation of the candidate document; and associating the candidate document with the first attribute value of the determined combined image-character based numerical representation of the index;

wherein the image-based numerical representation generation model, the character-based numerical representation generation model and the consolidated image-character based numerical representation generation model are trained using an objective function configured to maximise a similarity metric between numerical representations of training documents with an identifier common set of attributes.

\* \* \* \* \*